United States Patent [19]

McIntyre et al.

[11] Patent Number: 5,752,115
[45] Date of Patent: May 12, 1998

[54] AUTOFOCUS CAMERA WITH POWER CONTROL FOR EMITTED BEAM

[75] Inventors: Dale F. McIntyre, Honeoye Falls; Anthony W. Schrock, Rochester, both of N.Y.

[73] Assignee: Eastman Kodak Company, Rochester, N.Y.

[21] Appl. No.: 756,467

[22] Filed: Nov. 26, 1996

[51] Int. Cl.$^6$ .............................. G03B 13/00; G03B 1/08
[52] U.S. Cl. ............................................. 396/431; 396/108
[58] Field of Search ................................. 396/108, 431

[56] References Cited

U.S. PATENT DOCUMENTS

| | | | |
|---|---|---|---|
| 4,642,451 | 2/1987 | Tsunekawa et al. | 250/201 |
| 4,723,073 | 2/1988 | Amikura et al. | 250/201 |
| 4,827,302 | 5/1989 | Takahashi | 354/403 |
| 4,934,810 | 6/1990 | Nagele et al. | 356/1 |
| 5,059,019 | 10/1991 | McCullough | 352/131 |
| 5,150,146 | 9/1992 | Ueda et al. | 354/403 |
| 5,189,463 | 2/1993 | Capper et al. | 354/403 |
| 5,491,529 | 2/1996 | Iwai et al. | 354/266 |
| 5,530,512 | 6/1996 | McIntyre | 354/400 |
| 5,541,695 | 7/1996 | Teremy et al. | 354/266 |
| 5,543,888 | 8/1996 | Sosa et al. | 354/415 |
| 5,543,889 | 8/1996 | McIntyre | 354/432 |
| 5,546,156 | 8/1996 | McIntyre | 354/400 |

FOREIGN PATENT DOCUMENTS

| | | | |
|---|---|---|---|
| 2 252 836 A | 8/1992 | United Kingdom | G03B 15/03 |

*Primary Examiner*—Safet Metjahic
*Assistant Examiner*—Michael Dalakis
*Attorney, Agent, or Firm*—Charles E. Snee, III; Gordon M. Stewart

[57] ABSTRACT

A camera (10) includes a camera body (12), an objective lens (14) that receives light from a scene (34) and focuses the light on a focal plane (36) in the camera body. An emitter (18) receives power and produces a beam (66) oriented generally along an optical axis (20) of the objective lens such that the beam reflects from an object (32) in the scene. A sensor (22) measures an intensity level of a portion of the beam reflected back from the object to the sensor. An emitter controller (42) adjusts the output power of the emitter when the intensity level measured by the sensor for the reflected visible beam differs from a predetermined level. The beam may be visible or invisible. Corresponding methods of operating such a camera also are disclosed.

27 Claims, 4 Drawing Sheets

| POWER LEVEL | EXPECTED TARGET AND RANGE FOR STARTING RANGING |
|---|---|
| A | 80% REFLECTIVE TARGET WITHIN 4 FEET |
| B | 80% REFLECTIVE TARGET WITHIN 8 FEET |
| C | MAX POWER FOR MAX RANGE |

FIG. 4

| MODE | INITIAL LASER POWER LEVEL |
|---|---|
| GROUP | B |
| PORTRAIT | A |
| ACTION | C |
| LANDSCAPE | C |
| CLOSE UP | OFF, SET LENS AT FIXED POSITION |
| AUTO | OFF |
| OFF | OFF |

AUTOFOCUS CAMERA WITH POWER CONTROL FOR EMITTED BEAM

FIELD OF THE INVENTION

This invention relates generally to image capture apparatus and, more particularly, to autofocus cameras, with or without pointing aids, and methods of operating such cameras.

BACKGROUND OF THE INVENTION

Cameras serve as image capture apparatus, taking pictures of an ambient scene through an objective lens. For example, a photographic still camera stores an image, either photo-electronically into memory or photochemically onto a filmstrip, when an image capture button, such as a shutter button, is fully depressed. In a still camera, pressing the shutter button causes a shutter to be tripped, which permits light from the scene to pass through the objective lens and fall onto a photodiode array or film strip located at a focal plane of the lens. A video camera or movie camera captures a sequence of images that, when played back, presents the illusion of motion.

A camera user typically looks through a camera viewfinder to aim the camera at a particular point or object in the scene that is of interest. At times, such as under low light conditions or in a crowded scene, it can be difficult to judge the point in the scene toward which the camera is aimed and on which the lens of the camera should be focused. At other times, such as when tracking fast moving objects in the scene or when picture taking discretion is desired, it might be desirable to aim the camera without looking through the viewfinder at all.

For these and other reasons, some cameras are provided with an autofocus system which determines distance to an object in the scene and adjusts the focus of the camera to assure the user of a sharp image. Other cameras have been provided with a variety of pointing aid systems that help a camera user determine where in the scene the camera is aimed. Generally, such autofocus or pointing aid systems comprise a source of infrared invisible light or visible light whose output beam is substantially aligned with the optical axis of the camera's objective lens. The portion of the beam reflected from the object is detected and conventional triangulation techniques are used to determine the distance to the object. A single visible beam may be used in both an autofocus system and a pointing aid system. If the user observes that an object in a scene is illuminated by the beam, the user is assured that light from the object will be directed through the objective lens and onto the focal plane for image capture. Placing the pointing aid beam on an object of interest can be done with or without looking through the viewfinder. Furthermore, if the pointing aid beam also is the emitted beam of the autofocus system, the user is assured of capturing a well focused image.

For example, U.S. Pat. No. 4,827,302 discloses a camera having an autofocus system in which an emitted beam is reflected back to a sensor in the camera and triangulation is used to determine the distance to the object. U.S. Pat. No. 5,189,463 describes a video camera with a laser pointing system that is said to obviate the need for looking through a viewfinder to aim the camera. British Patent No. 2 252 836 describes a flashlight and photographic camera combination that optionally can include a laser, which is said to emit a beam that is aligned with the camera lens so as to indicate the object of which a photograph will be taken. The laser is said to make it easier to orient the camera lens.

While it is important that the emitted beam should be sufficiently bright to be readily seen by the camera user, it also is important that the beam not be so extraordinarily bright that it distracts persons or animals in the scene. In addition, it is important in an autofocus system or a pointing aid system that the output power of the beam not be so great that objects, persons, or animals in the scene might be damaged or unduly annoyed by the beam. For example, if the pointing aid beam were produced by a device such as a laser and the beam were to enter through the pupil of an eye of a person or animal in the scene, and if the laser output power were sufficiently great, then the laser beam could possibly cause damage to the retina. This potential problem can be particularly troublesome if the beam is not visible, such as a beam from an infrared emitting laser. Thus, it again would be desirable to permit control over the pointing aid beam output power.

Thus, a need has developed for a camera with an autofocus beam, which also may be a pointing aid beam, that does not use excessive power, to reduce the risk of damage or injury to objects, persons, and animals in the ambient scene. The present invention fulfills this need.

SUMMARY OF THE INVENTION

The present invention is directed to overcoming one or more of the problems set forth above.

A camera according to the invention may include a camera body; an objective lens for receiving light from an object in a scene and focusing the light on a focal plane within the camera body; a beam emitter having an output power level for producing a beam oriented generally along an optical axis of the objective lens such that the beam reflects from the object; and a sensor for measuring an intensity level of a portion of the beam, the portion having been reflected back from the object to the sensor, and for producing a first signal. When the beam emitter is part of a pointing aid system, it must be visible to the user. If the beam emitter is part of an autofocus system, it may be visible or invisible. In either case, uniquely in accordance with the invention, a controller is included which is responsive to the first signal for adjusting the output power when the intensity level of the portion reflected back differs from a predetermined level.

The camera may include an image capture button that can be pressed to a first position to initiate operation of the beam emitter and the sensor and to a second position to initiate an image capture operation; and the controller may provide power to the beam emitter only when the image capture button is pressed to the first position. The beam emitter may be part of a positioning aid system or an autofocus system, or both. The controller may increase the output power incrementally until the portion reflected back reaches the predetermined level. In one embodiment, the controller increases the output power in an incremental, stair-step fashion. The controller may increase the output power using a pulse width modulation technique. When the camera includes an autofocus system, the controller may determine a distance to the object when the portion reflected back reaches the predetermined level; and the camera may include a mechanism for adjusting a position of the lens in response to determination of the distance, to focus the light onto the focal plane.

In another embodiment, the camera may include a photographic mode selection switch that enables a user of the camera to select among several photographic modes, after which the controller can automatically adjust an initial magnitude of the output power. The switch may have a plurality of positions corresponding to different types of scenes to be photographed, the scenes typically being at different distances from the camera. Each type of scene may have a different initial magnitude of the output power; and for each position of the switch, the controller may increase the output power incrementally from the initial magnitude until the portion reflected back reaches the predetermined level. The photographic mode selection switch may have an additional position for which the controller disables the beam emitter. For each position of the switch, the controller may determine a distance to the object when the portion reflected back reaches the predetermined level and the camera also may include an autofocus system for adjusting a position of the lens in response to determination of the distance to the object to focus the light onto the focal plane.

Another embodiment of the camera may include a camera body; an objective lens for receiving light from an object in a scene and focusing the light on a focal plane within said camera body; a beam emitter having an output power level for producing a beam oriented generally along an optical axis of the objective lens such that the beam reflects from the object; a photographic mode selection switch that enables a user of the camera to select a magnitude for a fixed output power level, the switch having a plurality of positions corresponding to different types of scenes to be photographed, the scenes typically being at different distances from the camera, each type of scene requiring a respective fixed magnitude of the output power level; and a controller responsive to the positions for setting the output power level to a respective magnitude as required for a particular scene. The beam will be visible when it is part of a pointing aid system but may be visible or invisible when part of an autofocus system. The camera may include an autofocus system for adjusting a position of the lens in response to a change in position of the switch to focus the light onto the focal plane. The photographic mode selection switch may have an additional position for which the controller disables the beam emitter.

The method of the invention is useful for providing an emitted beam for assisting a camera user in focusing or pointing the camera, or both, so as to capture an image of an object in a scene through a camera objective lens. As such, the method may include steps of detecting pressing of an image capture button of the camera; responding to the pressing by emitting a beam at a predetermined intensity level from an emitter of the camera such that the beam is generally aligned with an optical axis of an objective lens of the camera; reflecting the beam from the object; measuring an intensity of a portion of the beam reflected back to the camera by the object; and adjusting the intensity level of the beam when intensity of the portion reflected differs from a predetermined level. The beam will be visible for use as a pointing aid, but may be visible or invisible for use in an autofocus system. The intensity level may be increased in an incremental, stair-step fashion. A pulse width modulation technique may be used to increase the duty cycle of the beam. The output power may be increased incrementally until the portion reflected back reaches the predetermined level. The method may include additional steps of determining a distance to the object when the portion reflected back reaches the predetermined level; and adjusting a position of the lens in response to determination of the distance to focus the light onto the focal plane.

The invention provides various advantages. By incrementally increasing the output power level of the beam when the measured intensity of the reflected output beam is below a predetermined level, the initial power level or intensity of the beam can be low. As a result, a relatively low power beam may be used which will be visible in the scene to the camera user, while the risk of injuring a person or animal in the scene is reduced; and electrical power is conserved. The time period is minimized for seeking a beam power level which will produce a suitable reflected intensity for pointing to or autofocus of the scene. Other features and advantages of the present invention should be apparent from the following description of the preferred embodiments, which illustrate, by way of example, the principles of the invention.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

The following is a detailed description of the various embodiments of the invention, reference being made to the drawings in which like reference numerals identify like elements in each of the several Figures.

Figure 1:
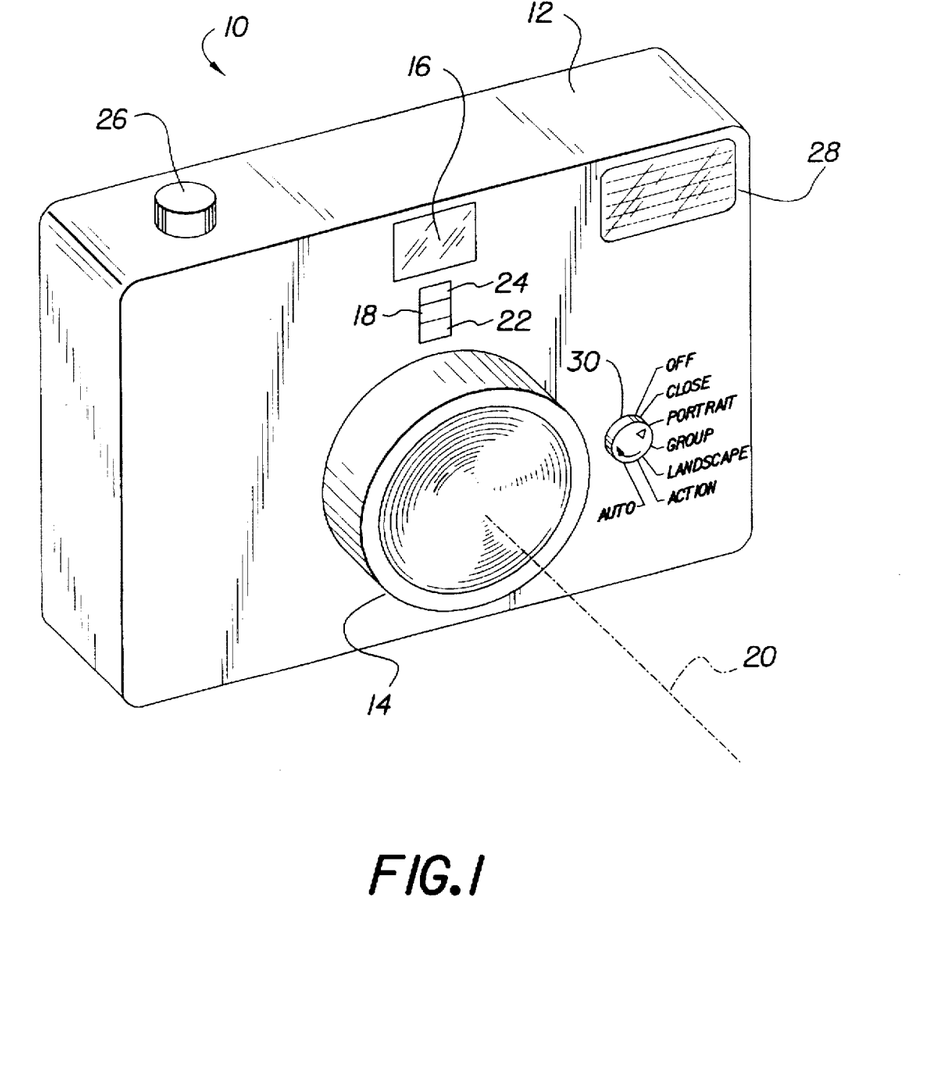
FIG. 1 is a perspective view of a camera constructed in accordance with the present invention.

FIG. 1 illustrates a camera 10 having a camera body 12 in which an objective lens 14 directs light from an ambient scene onto a focal plane for image capture. The camera in which the beam emitter is provided may be any one of a variety of image capture devices, such as a still camera that records images into an electronic memory for storage or onto a silver-halide filmstrip for exposure, or a video camera, or a movie film camera. The embodiments of the invention will be described with respect to a photographic still camera. A user of camera 10 can view the scene through a viewfinder 16.

Figure 2:
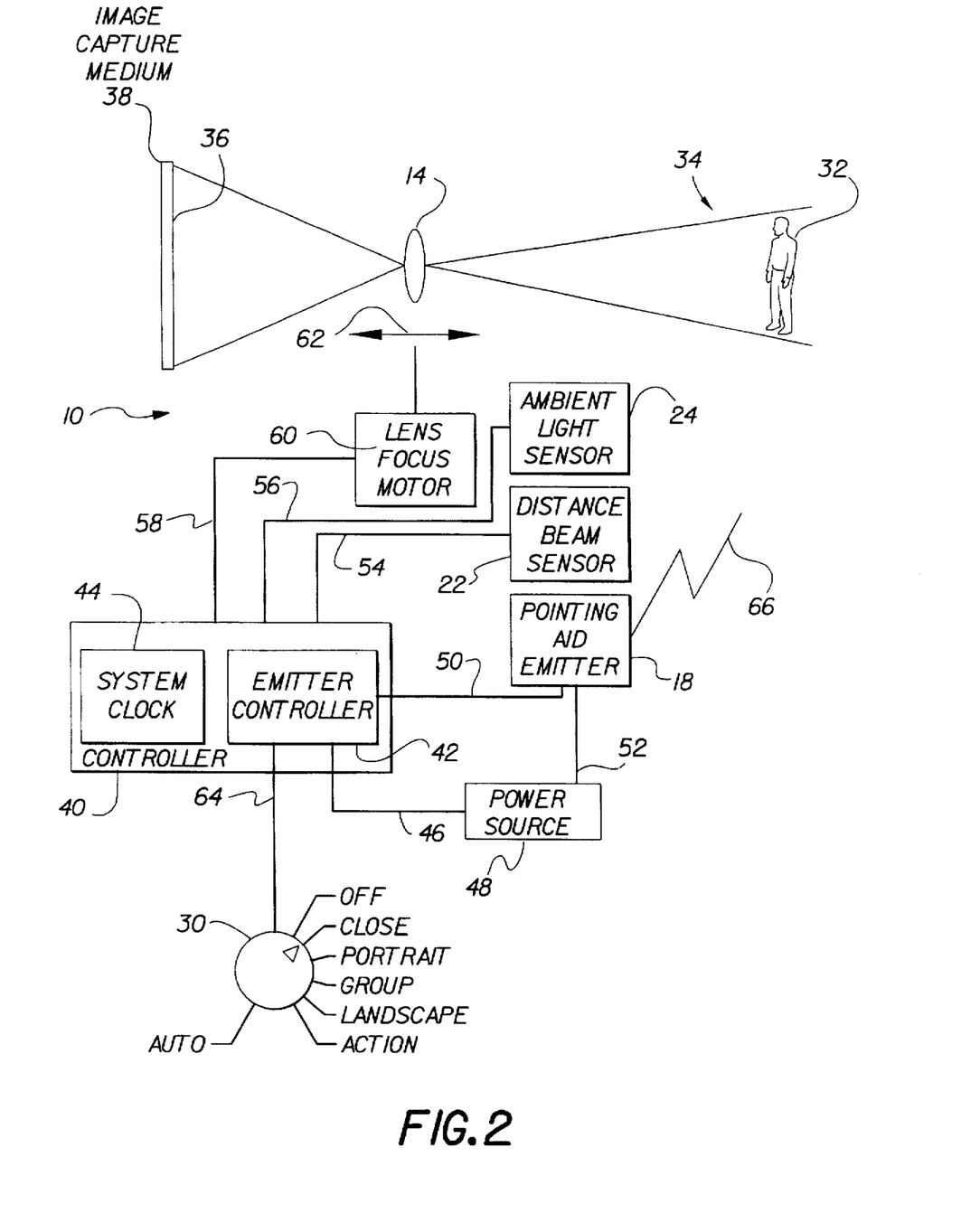
FIG. 2 is a schematic representation of the camera illustrated in FIG. 1.

As shown in FIGS. 1 and 2, camera 10 includes a beam emitter 18, such as a laser diode, that produces a beam generally aligned with an optical axis 20 of lens 14. Depending on the application, as previously discussed, the beam may be visible or invisible, such as infrared. When the beam is used as a pointing aid, it is visible in order to illuminate a portion of an object in the scene; so that, for example, the user will see a small red dot on the object. Of course, lasers emitting other colors may be used. A conventional distance beam sensor 22 measures an intensity and angle of a portion of the emitted beam which is reflected back to sensor 22 from the object, to enable a controller of the camera to determine by known triangulation techniques the distance to the object. Sensor 22 may include a photodiode selected to be highly sensitive to a wavelength band of light emitted by the laser diode. A filter may be placed in front of the photodiode to transmit only light in a wavelength band in which the laser diode emits. As will be explained in detail subsequently, output power of emitter 18 is increased in accordance with one embodiment of the invention, when the intensity of the reflected visible beam is below a predetermined level. As a result, visibility of the beam on the object is maintained for the user, while power consumption is minimized and the risk of damage to an object or person in the scene that is illuminated by the beam is reduced. An ambient light sensor 24 may be provided to detect the intensity of ambient light reflected from the scene.

Camera 10 includes a conventional image capture button 26 that is used to activate a mechanism of the camera to capture an image of the scene. In a still camera, image capture button 26 may be a conventional, two-position switch; so that, pressing the button to a first position activates the beam emitter 18 and pressing the button to a second position deactivates the beam emitter and activates the image capture mechanism of camera 10. Such a two-position switch is shown in commonly assigned U.S. Pat. No. 5,543,889 which is hereby incorporated by reference into this description. In a still camera, for example, the image capture mechanism would include a shutter, not illustrated. Deactivating the beam emitter during image capture assures the user that a pointing aid beam will not be visible in the captured image. Those skilled in the art will appreciate that other implementations of emitter control will be necessary for other types of cameras to avoid the presence of a pointing aid beam on objects in the captured images. For example, video cameras likely would have an image capture button that permits the pointing aid beam to be extinguished during actual image recording and to be illuminated during the vertical blanking interval known to those skilled in the art. A flash unit 28 may be used to provide supplemental illumination of the scene.

In some embodiments of the invention, an initial output power of the beam emitter can be controlled by a photographic mode selection switch 30 which the user positions depending on the type of scene being photographed. As will be explained subsequently in greater detail with reference to FIGS. 2 to 5, switch 30 may have a first position corresponding to an "Off" mode in which emitter 18 is disabled; a second position corresponding to a "Close Up" mode in which emitter 18 also would be disabled to prevent potential injury to the subject; a third position corresponding to a "Portrait" mode in which emitter 18 would be enabled at a low power level A; a fourth position corresponding to a "Group" mode in which emitter 18 would be enabled at a middle power level B; a fifth position corresponding to a "Landscape" mode in which emitter 18 would be enabled at a higher power level C; a sixth position corresponding to an "Action" mode in which emitter 18 also would be enabled at power level C; and a seventh position corresponding to an "Automatic" mode in which emitter 18 would be enabled incrementally starting at power level A and increasing to power level C until sensor 22 detects a reflected beam having an intensity at a level for accurate ranging.

As shown in FIG. 2, camera 10 has a field of view such that light from an object 32 in a scene 34 enters through objective lens 14 and is focused onto a focal plane 36 at which an image capture medium 38 is located. The image capture medium may comprise, for example, an array of electronic photoreceptors such as photodiodes for digital representation of the captured image, or may comprise a silver-halide filmstrip or plate that is exposed and then developed. A camera controller 40 includes an emitter controller 42 and a system clock 44. A connection line 46 extends from controller 42 to a power source 48. The power source may comprise, for example, a camera battery also used to power other camera systems. A connection line 50 extends from controller 42 to emitter 18 to enable the output power of emitter 18 to be increased in one embodiment, when the intensity of the reflected visible beam is below a predetermined level required for reliable ranging to the object. A connection line 52 extends between power source 48 and emitter 18. As is well known to those skilled in the camera control arts, distance beam sensor 22 may be a position sensitive device whose operation is understood to cause a signal to be generated that can be used to determine distance to an object upon receiving reflected light from an object in the scene. If insufficient reflected light is incident upon such a sensor, a typical camera controller deduces that an object of interest is sufficiently distant for setting the taking lens of the camera to infinity. In the controller of the present invention, the power to emitter 18 may be increased and another ranging attempted.

As described subsequently, in each embodiment, emitter 18 preferably is pulsed on and off sufficiently fast that the beam, if visible, is perceived to be steadily illuminated; and the beam output power is controlled by controlling the duty cycle of emitter 18. A connection line 54 extends between controller 40 and distance beam sensor 22. A connection line 56 extends between controller 40 and ambient light sensor 24. A connection line 58 extends between controller 40 and a conventional lens focus motor 60 which can move lens 14 back and forth as indicated by arrows 62 to focus light from object 32 on focal plane 36. In the conventional manner, operation of motor 60 depends on the distance to the object as determined by triangulation among emitter 18, sensor 22 and object 32. Finally, a connection line 64 extends between controller 42 and photographic mode selection switch 30.

OPERATION OF A FIRST EMBODIMENT

Figure 3:
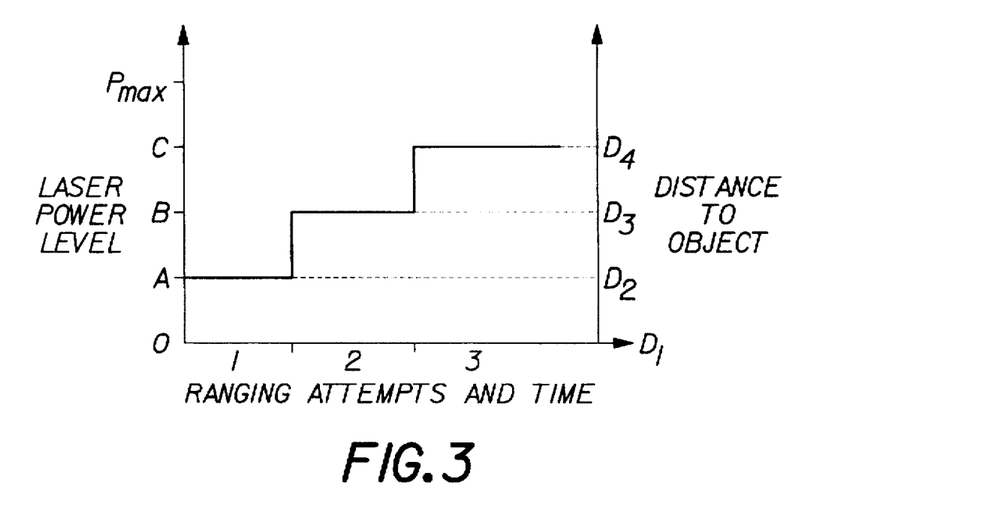
FIGS. 3, 4, and 5 are graphical and tabular representations of relationships among emitter output power, number of ranging attempts, and object distance.
Figure 4:
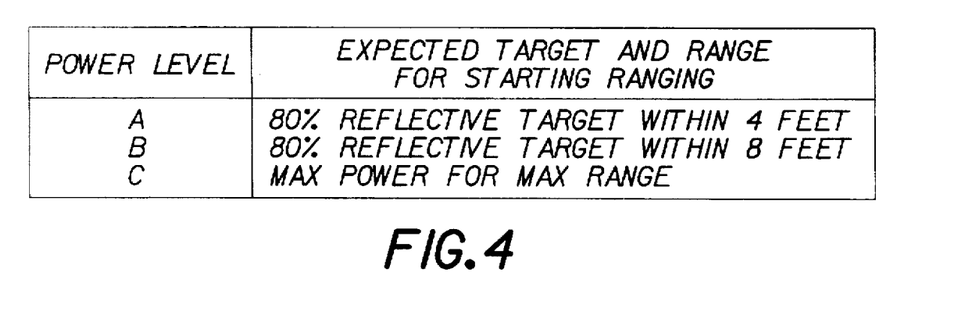

Operation of various embodiments of our invention will be explained with reference to FIGS. 3 to 5. In a first, automatic ranging embodiment, photographic mode selection switch 30 is omitted or is set to the "Auto" position. In either event, the output power of emitter 18 is incrementally increased until sensor 22 measures an intensity of the reflected beam which is above a predetermined minimum level required for accurate determination of the distance to object 32. FIG. 3 is a graphical representation of one suitable relationship among the laser output power level of emitter 18, sequential ranging attempts over time, and the distance along axis 20 to object 32. FIG. 4 shows how power levels A, B and C of FIG. 3 correspond to objects at progressively greater distances from the camera. The information of FIGS. 3 and 4 is stored in controller 42 as look-up tables, in a conventional manner as will be readily understood by those skilled in the camera control arts.

When the user presses image capture button 26 to its first position, controllers 40, 42 cause emitter 18 to emit a beam 66 toward object 32 at a power level A which should be adequate if objects are within distance D2 from the camera. A portion of beam 66 is reflected from the object to distance beam sensor 22 which sends to controller 40 a signal proportional to the intensity and angle of the reflected beam. If the intensity of the reflected portion at sensor 22 indicates that object 32 is less than a distance D1 from camera 10 and, thus, too close (less than about 4 feet or 1.22 meters) for safe use of emitter 18, controller 42 may reduce the laser power level from level A to zero or, at a minimum, to a low, safe level still sufficient for use of the emitted beam as a pointing aid. Absence of beam 66 indicates to the user that object 32 is too close to the camera. Rather than turning off emitter beam 66, controller 42 also could be set to take other action, such as flashing the beam on and off at perceptible intervals. Turning the beam off, however, conserves battery power.

On the other hand, if the intensity measured by sensor 22 falls below a predetermined level required for accurate determination of the distance to object 32, a second ranging attempt is made. In the second attempt, controller 42 increases the laser power level from level A to a level B which should be adequate if objects are within distance D3 from the camera. If the intensity measured by sensor 22 now equals or exceeds the predetermined level, the range to object 32 is determined by controller 40, which then instructs motor 60 to move lens 14 to the position required for proper focus. But, if the intensity measured by sensor 22 is still below the predetermined level, a third ranging attempt is made. Those skilled in the art will appreciate that any suitable number of ranging attempts could be included in the information of FIG. 3 and stored in controller 42. In the third attempt, controller 42 increases the laser power level from B to a level C which should be adequate if objects are within distance D4 from the camera. If the intensity measured by sensor 22 now equals or exceeds the predetermined level, lens 14 is moved to the position for proper focus, as previously described. If the intensity measured by sensor 22 is still below the predetermined level, object 32 is assumed to be at an essentially infinite distance from the camera. Controller 40 then instructs motor 60 to set the focus at infinity. Once the proper focus has been established after a ranging attempt, capture of the image proceeds when the user presses image capture button 26 to its second position.

FIGS. 3 and 4 show a suitable relationship for a ranging operation in the automatic mode at a low ambient light level, when photographic mode selection switch 30 has been set by the user to the Auto mode depicted in FIG. 2. In the automatic mode, controller 42 chooses the lowest, safest emitter power level A for the initial ranging attempt since the user has not been more specific about the intention of the photography by setting switch 30. For simplicity, a simple incremental, stair-step relationship is shown in FIG. 3; however, those skilled in the art will appreciate that a non-linear increase in power level with successive ranging attempts also would be useful. The relationship of FIG. 3 assumes that objects in the scene will have a reflectivity which varies only moderately from scene to scene. Those skilled in the art will appreciate that the optimum beam power for a scene will depend to an extent on the reflectivity of the objects in the scene.

As previously mentioned, the information of FIG. 3 would be stored in a look-up table in controller 42. Selections of the initial power levels A, B, C are based on the assumptions set forth in FIG. 4. Similar information also would be stored for medium and high ambient light levels, for example. Those skilled in the art will appreciate that the number of light levels is arbitrary and that information such as in FIG. 3 could be stored for as many ambient light levels as desired. In operation of the camera, the ambient light level would be measured using sensor 24 and would be compared to the information stored in the look-up table of controller 42 to select an appropriate incremental laser power level relationship. As indicated in FIG. 3, power levels A, B, and C generally correspond to progressively larger distances from camera 10 to object 32. Standard techniques known to those skilled in the art can be used to enable controller 42 to control the output power of emitted beam 66. FIG. 3 shows that the relationship of output power to distance to the object is a generally increasing one, up to a maximum output power $P_{max}$. Thus, FIG. 3 shows that the further object 32 is from camera 10, the more laser power will be permitted by controller 42. This relationship ensures that when a visible beam is used as a pointing aid under a low ambient light condition, the user will perceive a beam of relatively equal brightness on an object regardless of the distance from the camera to that object. Those skilled in the art will appreciate that relationships similar to that of FIG. 3 are readily determined for higher ambient light levels. For example, see commonly assigned U.S. Pat. Nos. 5,543,989 and 5,546,156 which are hereby incorporated by reference into this description.

A stair-step relationship between ranging attempts and beam output power as depicted in FIG. 3 is rather simple to implement. Thus, the power range of emitter 18 may be divided into several intervals which correspond approximately to distances to an object, such as D1 to D4. The beam output power increases with each ranging attempt but is constant within a given ranging attempt. In this way, beam output power is changed only when a ranging attempt is changed. In successive ranging attempts, controller 42 permits incremental increases in the power to emitter 18 until either the reflected light for the object causes a signal from sensor 22 sufficient to determine the distance to the object, or the output power of emitter 18 reaches level $P_{max}$. The number of data points that must be implemented by the emitter controller 42 thus is minimized. In the illustrated embodiment, only four distance intervals are shown; however, the number is arbitrary. Those skilled in the art will appreciate that a more nearly continuous relationship, such as a linear relationship or sinusoidal relationship, would require a greater number of data points.

OPERATION OF A SECOND EMBODIMENT

In a second embodiment of the invention, photographic mode selection switch 30 is included and may be set to any one of the first through sixth positions previously described. Of course, additional positions may be added for other modes corresponding to still other distances from the camera. The seventh "Auto" position optionally may be included to provide for automatic ranging in the manner described for the first embodiment. FIG. 5 shows information which would be stored in controller 42 as an additional look-up table indicating the power level of emitter 18 for each position of photographic mode selection switch 30. For the "Off" and "Close Up" modes, the power level is zero; for "Portrait" mode, level A; for "Group" mode, level B; and for "Landscape" and "Action" modes, level C.

Prior to using the camera, the user rotates switch 30 to the desired position for one of the six modes, taking care prior to each exposure to select a mode appropriate for the estimated distance of the object from the camera. When the user presses image capture button 26 to its first position, controller 42 checks the position of switch 30. If the user has selected the "Off" or "Close Up" mode, emitter 18 is disabled by controller 42. In the "Close Up" mode, controller 42 signals motor 60 to set the position of lens 14 accordingly. If the user has selected the "Portrait" mode, controller 42 checks the look-up tables including the information of FIGS. 4 and 5, and deduces that the object should be within 4 feet (1.22 meters). The controller then signals emitter 18 to operate at power level A to produce beam 66 and signals motor 60 to set the position of lens 14 accordingly If the user has selected the "Group" mode, controller 42 checks the look-tip tables and determines that the object should be within 8 feet (2.44 meters). The controller then signals emitter 18 to operate at power level B to produce beam 66 and signals motor 60 to position lens 14 accordingly. If the user has selected the "Landscape" or "Action" mode, controller 42 checks the look-up tables and determines that the object should be at the maximum range. The controller then signals emitter 18 to operate at power level C to produce beam 66 and signals motor 60 to position lens 14 accordingly. Once the proper focus has been established for the selected position of switch 30, capture of the image proceeds when the user presses image capture button 26 to its second position. If for any of the previously mentioned settings of switch 30 the initial power level produces an intensity at sensor 22 which is excessively high, the controller can automatically change to the "Auto" mode.

OPERATION OF A THIRD EMBODIMENT

In a third embodiment of the invention, photographic mode selection switch 30 is included and can be set to any one of the first through sixth positions previously described. The seventh "Auto" position also may be included. In the third embodiment, however, automatic ranging also is provided when the user selects any one of the "Portrait" or "Group" or "Landscape" or "Action" modes. For each of these four modes, automatic ranging begins at power level A, just as in the first embodiment.

When the user presses image capture button 26 to its first position, controller 42 checks the position of switch 30. If the user has selected the "Off" or "Close Up" mode, emitter 18 is disabled by controller 42. In the "Close Up" mode, controller 42 signals motor 60 to set the position of lens 14 accordingly. If the user has selected the "Portrait" mode, controller 42 checks the look-up tables including the information of FIGS. 3, 4 and 5, and determines that the initial and maximum power level should be level A for a portrait. The controller then signals emitter 18 to operate at power level A to produce beam 66. If the intensity measured by sensor 22 indicates that object 32 is less than a distance D1 from camera 10 and, thus, too close for safe use of emitter 18, controller 42 reduces the laser power level from level A to zero or, at a minimum, to a low, safe level still sufficient for use of the emitted beam as a pointing aid. Absence of beam 66 indicates to the user that the object is too close to the camera for use of an aiming beam. If at level A the intensity measured by sensor 22 falls below a predetermined level required for accurate determination of the distance to object 32, controller 40 may sound an alarm, not illustrated, to alert the user that the object is too far from the camera for a portrait. The user would then have to reposition photographic mode selection switch 30 or move closer to the object to allow the autofocus system to function at power level A. If the intensity measured by sensor 22 equals or exceeds the predetermined level, the range to object 32 is determined by controller 40, which then instructs motor 60 to move lens 14 to the position required for proper focus. Once the proper focus has been established for a portrait after a ranging attempt, capture of the image proceeds when the user presses image capture button 26 to its second position.

Figure 5:
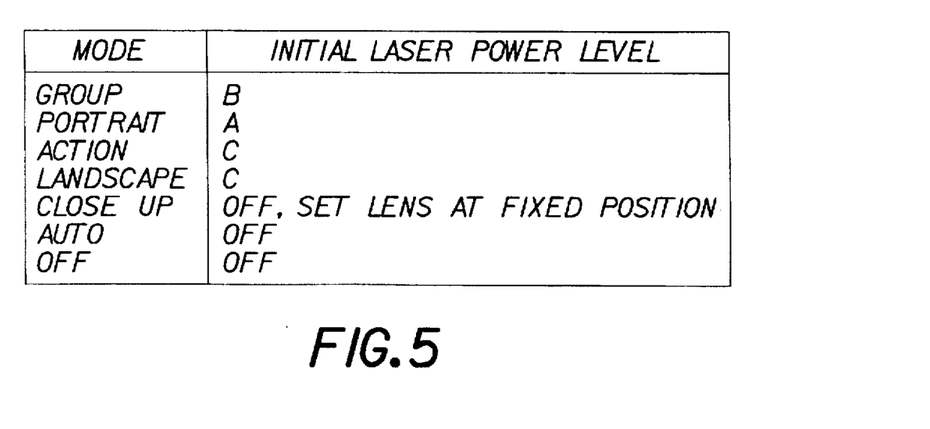

If the user has selected the "Group" mode, controller 42 checks the look-up tables including the information of FIGS. 3, 4 and 5, and determines that the initial power level should be level A and the maximum power level should be level B for a group. The controller then signals emitter 18 to operate at power level A to produce beam 66. If the intensity measured by sensor 22 indicates that object 32 is less than a distance D1 from camera 10 and, thus, too close for safe use of emitter 18, controller 42 reduces the laser power level from level A to zero or, at a minimum, to a low, safe level still sufficient for use of the emitted beam as a pointing aid. If the intensity measured by sensor 22 falls below a predetermined level required for accurate determination of the distance to object 32, a second ranging attempt is made. In the second attempt, controller 42 increases the power level from level A to a level, say, one third of the way between level A and level B. If additional ranging attempts are necessary, a third attempt could be at a level two thirds of the way between level A and level B; and a fourth attempt could be made at level B. Those skilled in the art will appreciate that any convenient number of power levels may be used, consistent with desired times for seeking the final power level. If at power level B the intensity measured by sensor 22 still falls below a predetermined level required for accurate determination of the distance to object 32, controller 40 may sound an alarm, not illustrated, to alert the user that the object is too far from the camera for a group. The user would then have to reposition switch 30 to allow the autofocus system to function at a higher power level. When the intensity measured by sensor 22 equals or exceeds the predetermined level, the range to object 32 is determined by controller 40, which then instructs motor 60 to move lens 14 to the position required for proper focus. Once the proper focus has been established for a group after a ranging attempt, capture of the image proceeds when the user presses image capture button 26 to its second position.

If the user has selected the "Landscape" or "Action" mode, controller 42 checks the look-up tables including the information of FIGS. 3, 4 and 5, and determines that the initial power level should be level A and the maximum power level should be level C for these modes. The controller then signals emitter 18 to operate at power level A to produce beam 66. If the intensity measured by sensor 22 indicates that object 32 is less than a distance D1 from camera 10 and, thus, too close for safe use of emitter 18, controller 42 reduces the laser power level from level A to zero or, at a minimum, to a low, safe level still sufficient for use of the emitted beam as a pointing aid. If the intensity measured by sensor 22 falls below a predetermined level required for accurate determination of the distance to object 32, a second ranging attempt is made. In the second attempt, controller 42 increases the power level from level A to level B. If additional ranging attempts are necessary, a third attempt could be at a level, say, one third of the way between level B and level C; a fourth attempt could be made at a level two thirds of the way between level B and level C; and a final attempt could be made at level C. If at power level C the intensity measured by sensor 22 still falls below a predetermined level required for accurate determination of the distance to object 32, controller 40 instructs motor 60 to set the focus for an object at infinity. When the intensity measured by sensor 22 equals or exceeds the predetermined level, the range to object 32 is determined by controller 40, which then instructs motor 60 to move lens 14 to the position required for proper focus. Once the proper focus has been established after a ranging attempt, capture of the image proceeds when the user presses image capture button 26 to its second position.

CONTROL OF OUTPUT POWER OF EMITTER

To control output power of emitter 18, controller 42 may use a variety of techniques. In each embodiment, the output beam is a laser beam and the method of controlling it is commonly referred to as a pulse width modulation technique. When the output beam is a laser beam, the maximum power output level is selected to be not greater than a value at which the beam would cause damage if it passed through the pupil of an observer's eye. The pulse width modulation technique reduces the power consumption for a perceived level of pointing aid beam brightness.

Figure 6:
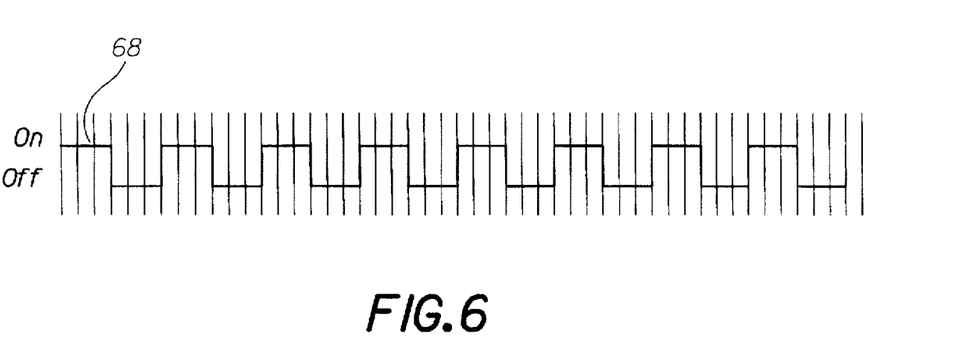
FIGS. 6, 7, and 8 are representations of a pulse width modulation technique for controlling the output power of the emitter.
Figure 7:
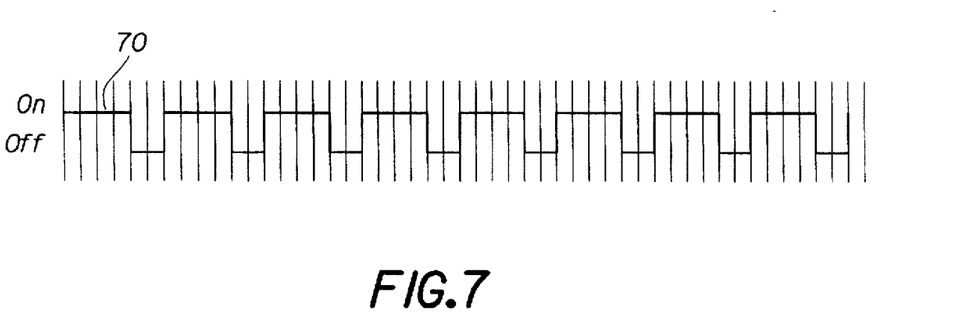
Figure 8:
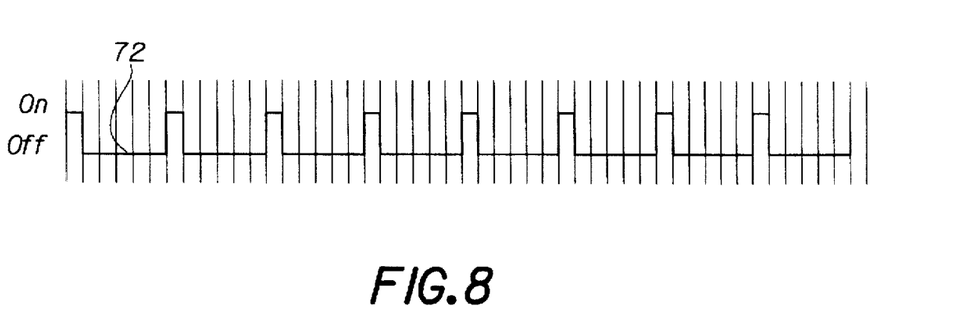

The pulse width modulation technique for controlling beam output power is illustrated in greater detail in FIGS. 6, 7, and 8. The pulse width modulation technique is used in conjunction with system clock 44. FIG. 6 shows a fifty percent duty cycle pulse signal 68 that turns on emitter 18 for three clock periods and then turns off the emitter for three clock periods. FIG. 7 shows a 66.67 percent duty cycle pulse signal 70. Those skilled in the art will appreciate that the FIG. 7 pulse signal represents a beam of increased output power because the "on" time for the FIG. 7 pulse signal is increased over that of the FIG. 6 pulse signal. That is, signal 70 turns on emitter 18 for four clock periods and then turns off the emitter for two clock periods. Similarly, FIG. 8 illustrates a 16.67 percent duty cycle pulse signal 72, which turns on emitter 18 for one clock period and then turns off the emitter for five clock periods. The precise duty cycles are selected based on the particular emitter used to provide desired output power; so that, the user perceives the beam to have a constant brightness. In view of this description, those skilled in the art will appreciate other variations on pulse width duty cycle signals to control the output power of the beam, as desired.

System clock 44 conveniently permits a beam exposure limit for automatic shut-off of emitter 18. This feature could be important, for example, if the emitter produces a laser beam and it is desired to limit the maximum time during which object 32 in scene 34 could be exposed to constant illumination; so that, the risk of injury would be reduced. When a camera user activates the emitter by pressing the image capture button 26, the emitter controller 42 uses the system clock to determine the length of time during which the user steadily presses the button. It is unlikely a user could fix the camera 10 such that beam 66 would be trained on the same spot for the entire duration of button pressing. Nevertheless, the emitter controller shuts off the emitter after a predetermined time interval of constant button pressing to limit the potential time of exposure to the beam. This reduces the risk of injury due to excessive beam exposure and also conserves the power source 48. The emitter beam can be re-activated only after the user releases the image capture button.

Thus, a camera constructed in accordance with the present invention emits a pointing aid beam that can assist a camera user in pointing the camera to capture the image of an object of interest with or without using a viewfinder. The output power image beam is controlled so that the user perceives a beam of generally equal brightness over variations in ambient light and camera-to-object distance, with minimum power consumption, and reduced risk of damage or injury.

The present invention has been described above in terms of presently preferred embodiments so that an understanding of the present invention can be conveyed. There are, however, many configurations for camera pointing aids not specifically described herein, but with which the present invention is applicable. The present invention should therefore not be seen as limited to the particular embodiments described herein, but rather, it should be understood that the present invention has wide applicability with respect to camera pointing aids generally. All modification, variations, or equivalent arrangements that are within the scope of the attached claims therefore should be considered within the scope of the invention.

Parts List 10 camera
12 camera body

-continued

Parts List 14 objective lens
16 viewfinder
18 beam emitter
20 optical axis of 14
22 distance beam sensor
24 ambient light sensor
26 image capture button
28 flash unit
30 photographic mode selection switch
32 object in ambient scene
34 ambient scene
36 focal plane
38 image capture medium
40 camera controller
42 emitter controller
44 system clock
46 connection line from 42 to 48
48 power source
50 connection line from 42 to 18
52 connection line from 48 to 18
54 connection line from 40 to 22
56 connection line from 40 to 24
58 connection line from 40 to 60
60 lens focus motor
62 lens movement arrows
64 connection line from 40 to 30
66 beam emitted from 18
68 50% duty cycle pulse signal
70 66.67% duty cycle pulse signal
72 16.67% duty cycle pulse signal While our invention has been described and shown with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A camera, comprising:

a camera body;

an objective lens for receiving light from an object in a scene and focusing the light on a focal plane within said camera body;

a photographic mode selection switch that enables a user of said camera to indicate a type of a scene to be photographed;

an emitter having an output power level for producing a beam oriented generally along an optical axis of said objective lens such that said beam reflects from the object;

a sensor for measuring an intensity level of a portion of said beam, said portion having been reflected back from the object to said sensor, and for producing a first signal; and a controller responsive to said photographic mode selection switch and to said first signal for adjusting said output power when said intensity level of said portion reflected back differs from a predetermined level.

2. A camera according to claim 1, wherein said beam is visible and is useful as a pointing aid.

3. A camera according to claim 1, further comprising an autofocus system which uses said reflected portion.

4. A camera according to claim 1, wherein said emitter comprises a visible laser light source.

5. A camera according to claim 1, further comprising:

an image capture button that can be pressed to a first position to initiate operation of said emitter and said sensor and to a second position to initiate an image capture operation; and wherein said controller provides power to said emitter only when said image capture button is pressed to said first position.

6. A camera according to claim 1, wherein said controller increases said output power in an incremental, stair-step fashion.

7. A camera according to claim 1, wherein:

said emitter comprises a visible laser light source; and said controller increases said output power using a pulse width modulation technique.

8. A camera according to claim 1, wherein:

said photographic mode selection switch has a plurality of positions corresponding to different types of scenes to be photographed, said scenes being at different distances from said camera;

each type of scene has a different initial magnitude of said output power; and for each position of said switch, said controller increases said output power incrementally from said initial magnitude until said portion reflected back reaches said predetermined level.

9. A camera according to claim 8, wherein said photographic mode selection switch has an additional position for which said controller disables said emitter.

10. A camera according to claim 8, wherein for each position of said switch, said controller determines a distance to the object when said portion reflected back reaches said predetermined level; further comprising an autofocus system for adjusting a position of said lens in response to determination of said distance to the object to focus said light onto said focal plane.

11. A camera according to claim 1, wherein:

said photographic mode selection switch has a plurality of positions corresponding to different types of scenes to be photographed, said scenes being at different distances from said camera;

each type of scene has a different initial magnitude of said output power; and for each position of said switch, said controller decreases said output power from said initial magnitude when said portion reflected back exceeds said predetermined level.

12. A camera according to claim 1, wherein said controller increases said output power incrementally until said portion reflected back reaches said predetermined level.

13. A camera according to claim 12, wherein said controller determines a distance to the object when said portion reflected back reaches said predetermined level; further comprising an autofocus system for adjusting a position of said lens in response to determination of said distance to focus said light onto said focal plane.

14. A camera, comprising:

a camera body;

an objective lens for receiving light from an object in a scene and focusing the light on a focal plane within said camera body;

an emitter having an output power level for producing a beam oriented generally along an optical axis of said objective lens such that said beam is reflected from the object;

a photographic mode selection switch that enables a user of said camera to select a magnitude for said output power level, said switch having a plurality of positions corresponding to different types of scenes to be photographed, said scenes being at different distances from said camera, each type of scene requiring a respective magnitude of said output power level;

an autofocus system for adjusting a position of said lens in response to a change in position of said photographic mode selection switch to focus said light onto said focal plane; and a controller responsive to said positions for adjusting said output power level to a respective magnitude as required for a particular scene.

15. A camera according to claim 14, wherein said beam is visible and is useful as a pointing aid.

16. A camera according to claim 14, further comprising an autofocus system which uses said reflected portion.

17. A camera according to claim 14, wherein said photographic mode selection switch has an additional position for which said controller disables said emitter.

18. A method of providing an emitted beam for assisting a camera user in focusing or pointing the camera, or both, so as to capture an image of an object in a scene through a camera objective lens, said method comprising steps of:

selecting a type of scene to be photographed using a mode selection switch on the camera;

detecting pressing of an image capture button of said camera;

responding to said pressing by emitting a beam from an emitter of said camera at a predetermined intensity level corresponding to said type of scene to be photographed, such that said beam is generally aligned with an optical axis of an objective lens of said camera;

reflecting said beam from the object;

measuring an intensity of a portion of said beam reflected back to said camera by the object; and adjusting said intensity level of said beam when said measured intensity differs from a predetermined level for said type of scene to be photographed.

19. A method according to claim 18, wherein said adjusting step comprises increasing said intensity level in an incremental, stair-step fashion.

20. A method according to claim 18, wherein said adjusting step uses a pulse width modulation technique to increase the duty cycle of the beam.

21. A method according to claim 18, wherein said adjusting step increases said output power incrementally until said portion reflected back reaches said predetermined level.

22. A method according to claim 21, further comprising steps of:

determining a distance to the object when said portion reflected back reaches said predetermined level; and adjusting a position of said lens in response to determination of said distance to focus said light onto said focal plane.

23. A method according to claim 18, wherein said beam is visible and is useful as a pointing aid.

24. A method according to claim 18, wherein said beam is visible.

25. A method according to claim 18, wherein said beam is invisible.

26. A method according to claim 18, wherein said beam is infrared.

27. A camera according to claim 3, wherein said emitter comprises a visible laser light source.

* * * * *